(12) United States Patent
Wanas et al.

(10) Patent No.: US 8,893,024 B2
(45) Date of Patent: Nov. 18, 2014

(54) USER EVALUATION IN A COLLABORATIVE ONLINE FORUM

(75) Inventors: Nayer M. Wanas, Cairo (EG); Heba M. Ashour, Cairo (EG); Mostafa M. El Baradei, Cairo (EG); Ahmed A. Morsy, Cairo (EG); Motaz A. El-Saban, Cairo (EG); Waleed A. Ammar, Cairo (EG)

(73) Assignee: Microsoft Corporation, Redmond, WA (US)

( * ) Notice: Subject to any disclaimer, the term of this patent is extended or adjusted under 35 U.S.C. 154(b) by 1106 days.

(21) Appl. No.: 12/344,160

(22) Filed: Dec. 24, 2008

(65) Prior Publication Data

US 2010/0162135 A1 Jun. 24, 2010

(51) Int. Cl.
*G06F 3/048* (2013.01)
*G06F 15/16* (2006.01)
*H04L 12/18* (2006.01)
*H04N 21/4788* (2011.01)

(52) U.S. Cl.
CPC ............ *G06F 3/048* (2013.01); *H04L 12/1822* (2013.01); *H04N 21/4788* (2013.01)
USPC ............ 715/753; 715/733; 715/743; 715/758

(58) Field of Classification Search
CPC . G06F 3/048; H04L 12/1822; H04N 21/4788
USPC .................. 715/753, 758, 743, 733
See application file for complete search history.

(56) References Cited

U.S. PATENT DOCUMENTS 6,347,333 B2   2/2002   Eisendrath et al.
6,370,355 B1   4/2002   Ceretta et al.
6,652,287 B1 * 11/2003  Strub et al. .................... 434/365
7,200,606 B2   4/2007   Elkan
2004/0267565 A1 * 12/2004 Grube ............................ 705/2
2007/0214097 A1  9/2007  Parsons et al.
2008/0046394 A1  2/2008  Zhou et al.

FOREIGN PATENT DOCUMENTS

WO      0108124 A1   2/2001
WO   2007062450 A1   6/2007

OTHER PUBLICATIONS

"PostingRank: Bringing Order to Web Forum Postings" (hereinafter PostingRank) by Zhi Chen, Li Zhang, and Weihua Wang in proceeding of: Information Retrieval Technology, 4th Asia Information Retrieval Symposium, AIRS 2008, Harbin, China, Jan. 15-18, 2008.*

(Continued)

*Primary Examiner* — Steven B Theriault
*Assistant Examiner* — Peiyong Weng
(74) *Attorney, Agent, or Firm* — Pablo Tapia; Leonard Smith; Mickey Minhas

(57) ABSTRACT

Users of a collaborative online forum may be evaluated automatically with the results made available to a supervisor. In an example embodiment, a method involves accessing multiple posts that are associated with multiple users, with each post of the multiple posts including content. Post scores for the multiple posts are ascertained based on one or more features. User interactions are analyzed with regard to the multiple posts to identify relationships among the multiple users and the content included in the multiple posts. The post scores and the user interactions are evaluated to determine respective collaboration scores for respective users of the multiple users. A user interface that provides access to the collaboration scores is presented to a supervisor.

19 Claims, 11 Drawing Sheets

(56) References Cited

OTHER PUBLICATIONS

Lui, et al. "An Evaluation of Automatic Text Categorization in Online Discussion Analysis", Retrieved at<<http://ieeexplore.ieee.org/iel5/4280926/4280927/04280992.pdf?isnumber=4280927&prod=CNF&arnumber=4280992&arSt=205&ared=209&arAuthor=Lui%2C+Andrew+Kwok-Fai%3B+Li%2C+Siu+Cheung%3B+Choy%2C+Sheung+On&htry=1>>, Seventh IEEE International Conference on Advanced Learning Technologies (ICALT 2007), 2007 IEEE, pp. 5.

Dringus, et al. "Using Data Mining as a Strategy for Assessing Asynchronous Discussion Forums ", Retrieved at<<http://sci2s.ugr.es/keel/pdf/specific/articulo/dringusarticle.pdf>>, Aug. 12, 2003, pp. 141-160.

Carlson Adam, "Tools for Ubiquitous Assessment in Discussion-Based Pedagogy", Retrieved at<<http://ieeexplore.ieee.org/iel5/8908/28166/01260248.pdf?arnumber=1260248>>, 2003IEEE, pp. 277-278.

"Towards Automatic Scaffolding of On-Line Discussions in Engineering Courses", Retrieved at<<http://www.isi.edu/~jihie/papers/AERA-08-Kim.pdf>>, Draft submitted to AERA 2008, pp. 6.

Hein, et al. "Assessment of Student Understanding Using On-line Discussion Groups", Retrieved at<<http://fie.engrng.pitt.edu/fie98/papers/1375.pdf>>, Session T2B, 1998 FIE Conference, pp. 130-135.

Swan, et al. "Assessment and Collaboration in Online Learning", Retrieved at<<http://www.aln.org/publications/jaln/v10n1/pdf/v10n1_5swan.pdf>>, pp. 45-62.

Weimer, et al. "Automatically Assessing the Post Quality in Online Discussions on Software", In Proceedings of the 45th Annual Meeting of the Association for Computational Linguistics (Prague, Czech Republic, Jun. 23-30, 2007). ACL2007 vol. P07-2, pp. 125-128.

\* cited by examiner

US 8,893,024 B2

USER EVALUATION IN A COLLABORATIVE ONLINE FORUM

BACKGROUND

Higher education, especially in emerging markets, is often characterized by high student-to-instructor ratios. These high student-to-instructor ratios translate to a very low level of student and instructor interaction. Consequently, there is a time-fairness trade-off in the assessment of student participation and involvement.

Virtual Learning environments (VLCs), and specifically conversational cyberspaces, have the potential to increase the level of interaction between and among students, especially with regard to each other. Such conversational cyberspaces can also facilitate interactions between students and their instructors. However, the extra burden that would be placed upon instructors by their adoption of conventional VLCs acts as a barrier to the introduction of these tools.

The greatest impact of the burden that would result from the adoption of VLCs into secondary education classrooms probably falls upon professors of relatively larger class sizes. However, this burden also slows VLC adoption in classes of relatively smaller sizes. Moreover, the monitoring of participation and involvement in conversational cyberspaces generally presents a burden for a moderator even in environments outside those of education.

SUMMARY

Users of a collaborative online forum may be evaluated automatically with the results made available to a supervisor. For certain embodiments generally, users submit posts having content to a forum service. Post scores for the posts are ascertained based one or more features. The features may be inputs to a classifier-type machine learning system. User interactions are also derived from the posts. From the user interactions and the post scores, respective collaboration scores for respective users are determined. The collaboration scores may be presented to the supervisor in a dashboard-style user interface. The user interface may display users in ranked order and/or provide access to other collaborative indicia or forum data. Interactivity graphs that indicate interactions between and among different users may also be included in the dashboard.

In an example embodiment, a method involves accessing multiple posts that are associated with multiple users, with each post of the multiple posts including content. Post scores for the multiple posts are ascertained based on one or more features. User interactions are analyzed with regard to the multiple posts to identify relationships among the multiple users and the content included in the multiple posts. The post scores and the user interactions are evaluated to determine respective collaboration scores for respective users of the multiple users. A user interface that provides access to the collaboration scores is presented to a supervisor.

In another example embodiment, a device is adapted to evaluate users in a collaborative online forum. The device includes a collaboration evaluator and a dashboard creator. The collaboration evaluator accesses multiple posts that are associated with multiple users, with each post of the multiple posts including content. The collaboration evaluator includes a post score ascertainer, a user interactions analyzer, and a collaboration score determiner. The post score ascertainer ascertains post scores for the multiple posts based on one or more features.

The user interactions analyzer analyzes user interactions with regard to the multiple posts to identify relationships among the multiple users and the content included in the multiple posts. The collaboration score determiner evaluates the post scores and the user interactions to determine respective collaboration scores for respective users of the multiple users. The dashboard creator presents a user interface that provides access to the collaboration scores.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other systems, methods, devices, media, apparatuses, arrangements, and other example embodiments are described herein.

BRIEF DESCRIPTION OF THE DRAWINGS

The same numbers are used throughout the drawings to reference like and/or corresponding aspects, features, and components.

DETAILED DESCRIPTION

As explained herein above, in educational environments there is an acute lack of student and instructor interaction, particularly in high-density classrooms. To at least partially address this deficiency, certain embodiments that are described herein facilitate the evaluation of intra-student collaboration via online discussion forums. Certain embodiments of the evaluation tools are intended to avoid consuming significant instructor time and also to avoid a significant information-technology commitment from the instructor.

In an example embodiment, an automated system enables the automatic prediction of a posting value for individual posts within an online discussion forum, with the prediction being based on features extracted from within the content of the online posts. Additionally, content analysis enables the detection and identification of different communities and interactive roles within the online discussion forum. As a result, a collective evaluation dashboard may be presented that allows supervisors (e.g., instructors) to effectively monitor and observe the forum in general. The dashboard also permits a supervisor to focus on each individual user (e.g., student) separately.

In a classroom environment, the dashboard can therefore significantly reduce the burden on an instructor who wishes to integrate online discussion forums into the educational system. Embodiments that are described herein, however, are also applicable to other environments besides education. Examples of other relevant environments are described herein below, particularly with reference to FIG. 1.

Figure 1:
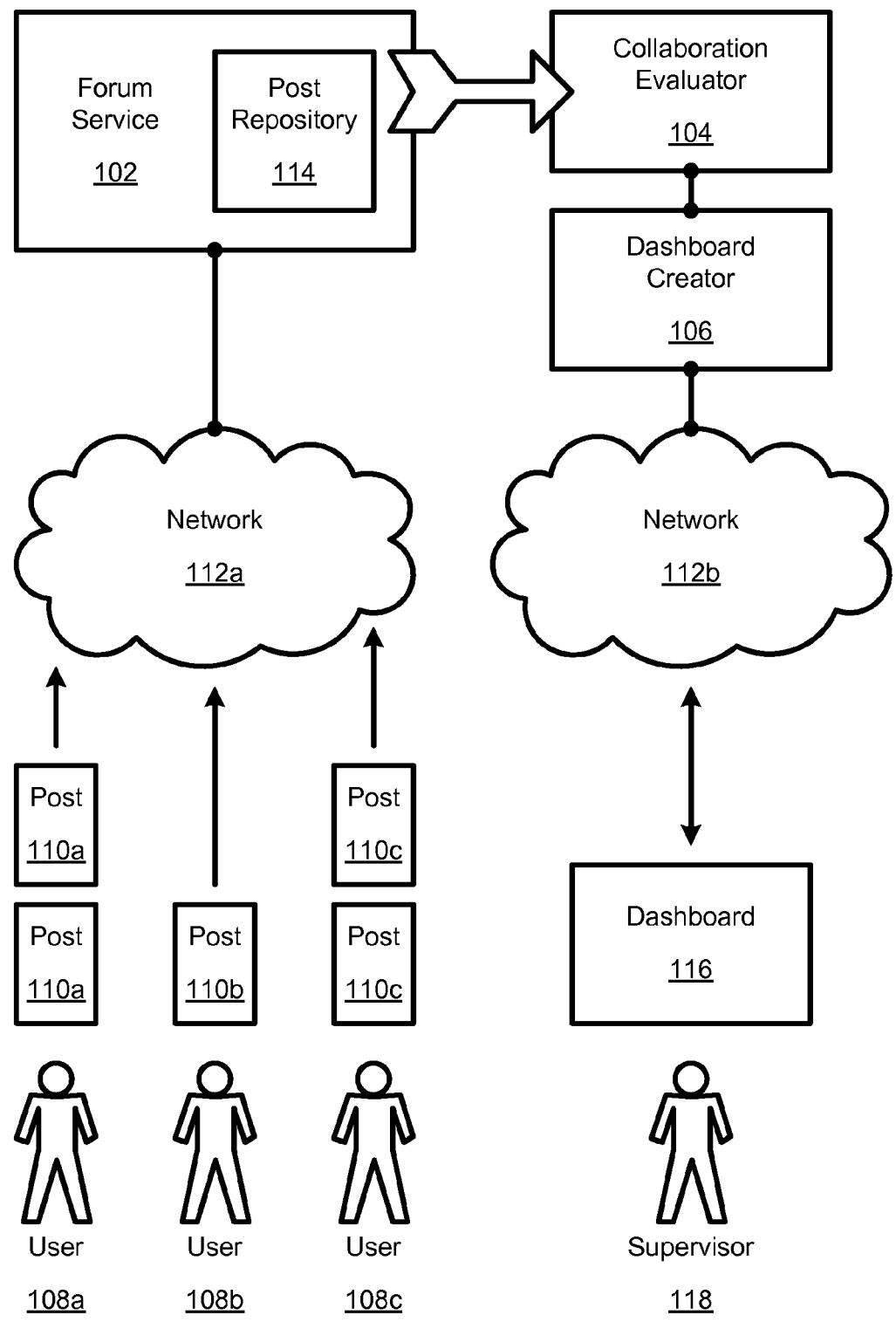
FIG. 1 illustrates an example general environment in which users may be evaluated in a collaborative online forum using a collaboration evaluator and a dashboard creator.

FIG. 1 illustrates an example general environment 100 in which users 108 may be evaluated in a collaborative online forum using a collaboration evaluator 104 and a dashboard creator 106. As illustrated, environment 100 includes a forum service 102 and network(s) 112 in addition to collaboration evaluator 104 and dashboard creator 106. Environment 100 also includes multiple users 108 that produce posts 110 and at least one supervisor 118 that is provided access to a dashboard 116. Forum service 102 includes a post repository 114.

For example embodiments, each respective user 108a,b,c produces one or more respective posts 110a,b,c. Although three users 108 are shown, environment 100 may entail more (or fewer) such users 108. Each post 110 includes content (not explicitly shown). Posts 110 are typically produced by a user 108 at an end device of the user (not shown). Posts 110 are communicated from the end device of the user and submitted to forum service 102 over network 112a.

At forum service 102, posts 110 are accumulated at post repository 114. Upon request, at a predetermined interval, etc., forum service 102 provides access for collaboration evaluator 104 to post repository 114. After collaboration evaluator 104 performs at least part of the evaluation on posts 110, dashboard creator 106 is responsible for creating dashboard 116. Dashboard 116 is provided from dashboard creator 106 to supervisor 118 via network 112b. Dashboard 116 may be displayed on a screen of an end device (not shown) of supervisor 118.

The evaluation of users in a collaborative online forum may be implemented in any of many alternative forms. For example, although shown as being separate, collaboration evaluator 104 and dashboard creator 106 may be realized together in an integrated form. Moreover, forum service 102, collaboration evaluator 104, and/or dashboard creator 106 may be combined into a single service. Such a service may be implemented, for example, as a web service or a service provided by a corporate or education campus information technology infrastructure.

Especially in a web service scenario, at least a portion of network 112a and/or network 112b may be an internet. Alternatively, network 112a and/or network 112b may be one or more local area networks (LANs) or any other type of network(s). Hence, forum service 102, collaboration evaluator 104, and/or dashboard creator 106 may be implemented on a server device (e.g., a web server) or on one or more other devices. An example implementation for server devices, end devices, etc. is described herein below with particular reference to FIG. 9.

Users 108 may be, by way of example but not limitation, a student, an employee, a conference attendee, a customer, and so forth. Thus, a supervisor 118 may respectively be an instructor, a boss or manager, a speaker or panel moderator, a company representative, and so forth. Correspondingly, the online collaboration represented by forum service 102 may be related to an educational environment, an employment environment, a seminar environment, a business environment, and so forth.

An example operation conducted by collaboration evaluator 104 is described herein below with particular reference to FIGS. 3, 4, and 5. An example operation conducted by dashboard creator 106 is described herein below with particular reference to FIG. 7. Example user interfaces for a dashboard 116 are described herein below with particular reference to FIGS. 8A-8D. An example overall method is described herein below with particular reference to FIG. 6.

Figure 2:
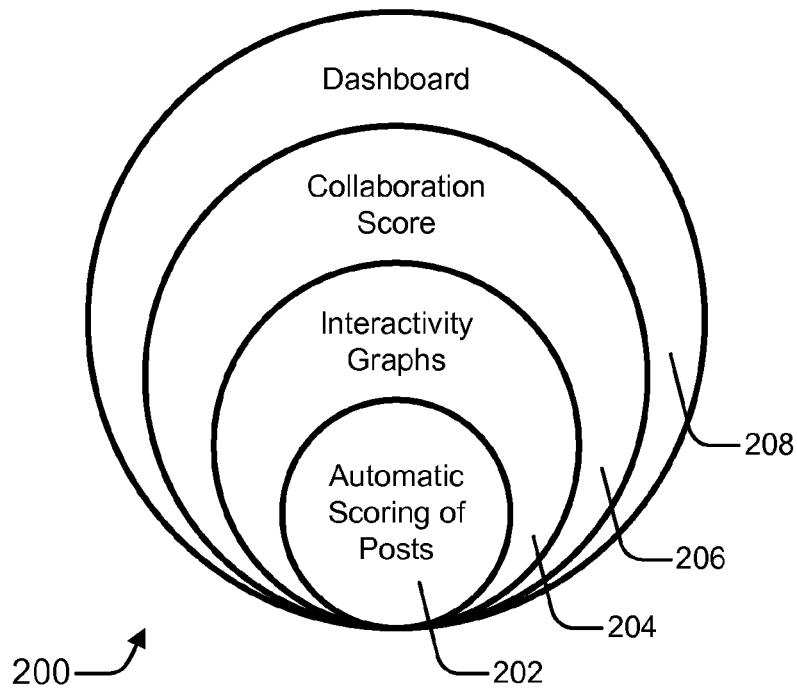
FIG. 2 depicts example architecture for evaluating users in a collaborative online forum.

FIG. 2 depicts example architecture 200 for evaluating users in a collaborative online forum. In an example embodiment as illustrated in architecture 200, posts that are submitted by users may be scored automatically 202. In other words, each post may be scored without manual intervention by the supervisor when producing post scores. From a set of posts from multiple users, the interactivity among them may be analyzed and interactivity graphs 204 may be produced from the analysis. From the post scores and the user interactions, a collaboration score 206 may be produced. A dashboard 208 may be created to present information derived from the post scores, the user interactions, and/or the collaboration scores.

Figure 3:
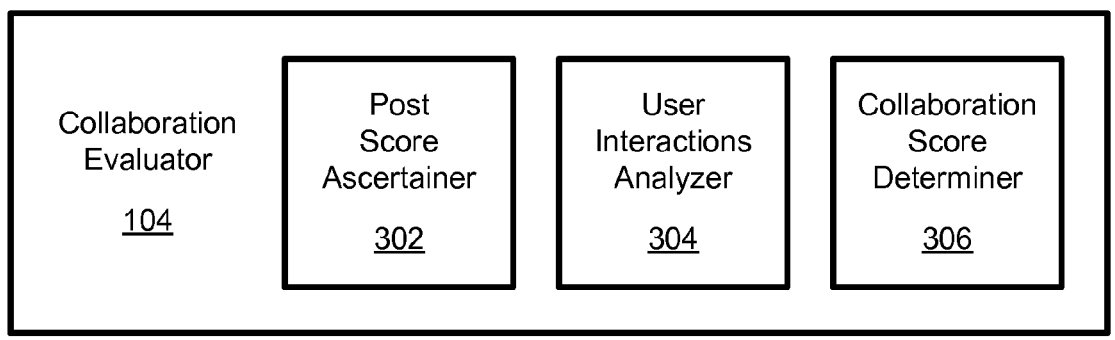
FIG. 3 is a block diagram illustrating an example collaboration evaluator that includes a post score ascertainer, a user interactions analyzer, and a collaboration score determiner.

FIG. 3 is a block diagram illustrating an example collaboration evaluator 104 that includes a post score ascertainer 302, a user interactions analyzer 304, and a collaboration score determiner 306. Example embodiments for post score ascertainer 302 are described herein below in terms of an example operation that is illustrated in FIG. 4. Example embodiments for user interactions analyzer 304 and collaboration score determiner 306 are described herein below in terms of an example operation that is illustrated in FIG. 5.

Collaboration evaluator 104, the components thereof, and/or dashboard creator 106 (of FIG. 1) may be realized as processor-executable instructions. They may be fully or partially separate or combined modules, programs, applications, etc. formed from processor-executable instructions. Processor-executable instructions may be embodied as hardware, firmware, software, fixed logic circuitry, combinations thereof, and so forth.

In an example embodiment, a device that is adapted to evaluate users in a collaborative online forum includes a collaboration evaluator 104 and a dashboard creator 106 (e.g., of FIG. 1). Collaboration evaluator 104 accesses multiple posts 110 that are associated with multiple users 108, with each post of the multiple posts including content. Collaboration evaluator 104 includes a post score ascertainer 302, a user interactions analyzer 304, and a collaboration score determiner 306.

Figure 7:
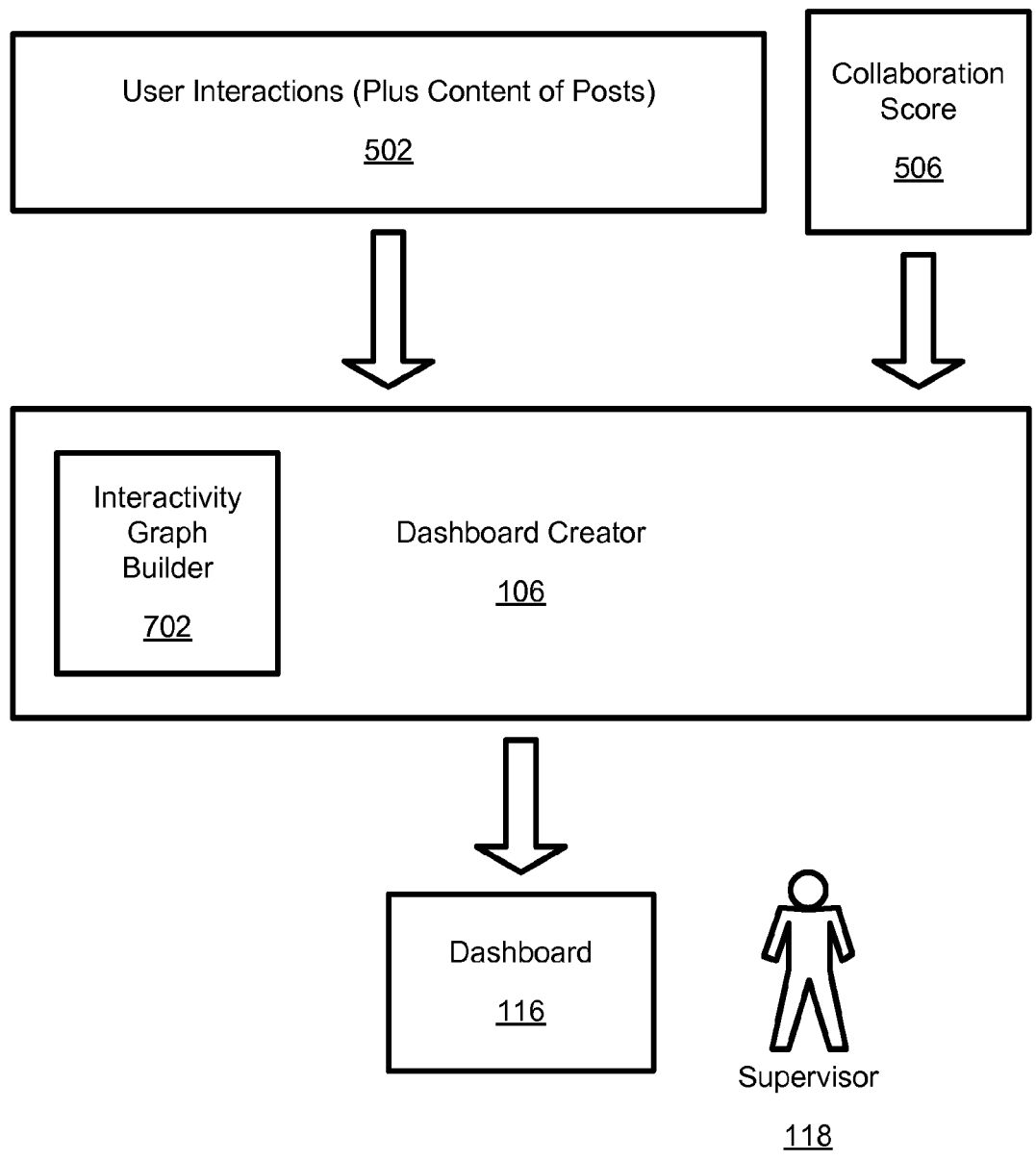
FIG. 7 is a block diagram that illustrates an operation for an example dashboard creator.

Post score ascertainer 302 ascertains post scores for the multiple posts 110 based on one or more features. User interactions analyzer 304 analyzes user interactions with regard to the multiple posts 110 to identify relationships among the multiple users 108 and the content included in the multiple posts 110. Collaboration score determiner 306 evaluates the post scores and the user interactions to determine respective collaboration scores for respective users of the multiple users 108. Dashboard creator 106 presents a user interface that provides access to the collaboration scores. Example embodiments for dashboard creator 106 are described herein below in terms of an example operation that is illustrated in FIG. 7.

Figure 4:
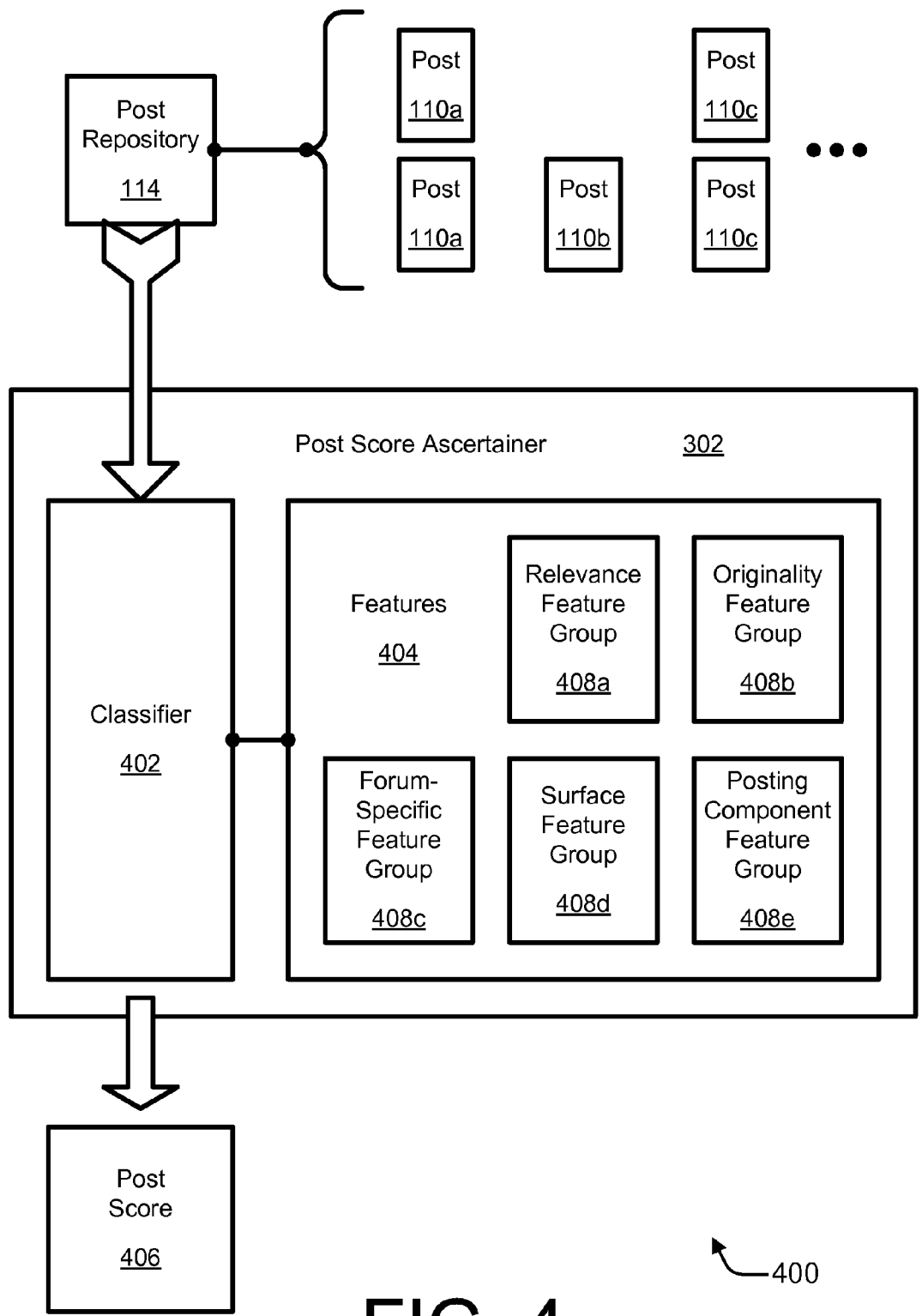
FIG. 4 is a block diagram that illustrates an operation for an example post score ascertainer.

FIG. 4 is a block diagram that illustrates an operation 400 for an example post score ascertainer 302. As illustrated, example operation 400 involves post repository 114 that stores multiple posts 110, post score ascertainer 302, and post score 406. Example post score ascertainer 302 includes a classifier 402 and multiple features 404. Features 404 include multiple feature groups 408.

Although five feature groups 408 are shown, more or fewer feature groups 408 may be implemented. By way of example only, these five feature groups 408 may include a relevance feature group 408a, an originality feature group 408b, a forum-specific feature group 408c, a surface feature group 408d, and a posting component feature group 408e. Also, different individual features 404 may be utilized in different implementations. Moreover, a supervisor may be empowered (e.g., via a dashboard user interface) to select which feature groups 408 and/or which features 404 are utilized by classifier 402 in the ascertainment of post score 406.

In an example embodiment, multiple posts 110 are provided from post repository 114 to post score ascertainer 302. At least partially based on posts 110, post score ascertainer 302 ascertains one or more post scores 406. For example, post score ascertainer 302 may ascertain a respective post score 406 for each respective post 110 and/or each respective user 108. Post score 406 is ascertained using classifier 402 based on one or more features 404.

More specifically, classifier 402 enables post score ascertainer 302 to automatically assess values of individual posts. Classifier 402 may be realized as a machine learning system that automatically calculates a seeding value for individual forum posts. A set of feature groups 408 through which classifier 402 is invoked is used to assess the value of posts. In an example implementation, a total of 22 features 404 are divided into the five feature groups 408. The five example feature groups 408 are described immediately below from a general and relatively qualitative perspective. They are described more specifically and relatively quantitatively thereafter. It should be understood, however, that other features 404 (e.g., such as one or more directed to a user credibility measure, etc.) may additionally and/or alternatively be factored into the classification procedure by classifier 402.

For relevance feature group 408a, the relevance of a given post by an individual user is factored into the classification. Two example relevance features are described qualitatively. OnThreadTopic is a measure of the number of matching words between the thread title and leading post and any subsequently submitted reply posts. OnSubForumTopic is a measure through which keywords that are extracted using a bag of words (BOW) approach from the content of the sub-forum as it evolves are compared to those of the given post. Example BOW approaches include, but are not limited to, a Term Frequency Inverse Document Frequency (tfidf) scheme, a Bio-nomial Loglikelihood Ratio Test (BLRT) scheme, combinations thereof, and so forth.

For originality feature group 408b, the originality of a given post by an individual user is factored into the classification. Two example originality features are described qualitatively. OverlapPrevious measures the maximum degree of overlap between the words contained in a given post and the words of the leading posts in the same thread. OverlapDistance is a measure of the number of posts separating a given post from the one judged as the most overlapping by the OverlapPrevious feature.

For forum-specific feature group 408c, forum-specific aspects of a given post by an individual user are factored into the classification. Two example forum-specific features are described qualitatively. Referencing measures the ratio of quoted text of a given post to post size and is normalized by the size of the original post. Replies measures the number of replies a given post generates. In the case of a nested reply structure, the maximum depth may also be calculated.

For surface feature group 408d, surface aspects of a given post by an individual user are factored into the classification. Three example surface features are described qualitatively. Timeliness measures the inter-posting time of the given post as normalized by the average (e.g., mean) inter-posting time of a community defined by the collaborative online forum. Lengthiness measures the word count of a given post and is normalized by the average (e.g., mean) length of posts in a given thread. Formatting Quality measures the "excessive" use of creative punctuation (e.g., punctuation marks, emoticons, consecutive capital letters, etc.) that are used in a given post. It may be normalized by the length of the given post.

For posting component feature group 408e, components that make up a given post by an individual user are factored into the classification. Two example posting component features are described qualitatively. WebLinks is a measure of the value added by the presence of a web-link in a given post, in terms of its relevance, presentation, and the effort made by the posting user to explain its context. Questioning measures the number of questions contained within a given post as well as the average and standard deviation of the similarity between them and those previously indexed as part of the online collaboration forum. The question(s) of the given post and the indexed questions may be evaluated using, e.g., cosine similarity.

Example implementations for features 404 are now described more specifically and relatively quantitatively. In an example embodiment, post scores are assigned one of three levels (e.g., Low, Medium, and High). The system may be conscious of linguistic phenomena pertaining to online discussion forums. This is achieved by avoiding commitment to linguistic features and by generating keywords from within the forum, instead of using a predefined lexicon of terminology and jargon. This follows from the likelihood that keywords used within online discussion forums reflect the understanding that the community has as to specific terms. These forum-specific meanings may not be similar to the way other communities perceive meanings of the same terms. Thus, such an approach that includes community specific jargon may be relatively independent of common language patterns.

Online discussion forum posts are usually characterized as being relatively short text fragments. Users also take significant liberties in the language and presentation styles of posts. Another relevant factor that affects the way that users perceive online discussion forums is their order and relationship with other posts, in addition to their posting location. Collectively, these factors render the accurate and exact evaluation of posts a difficult task.

A relatively significant amount of Natural Language Processing (NLP) may be employed to fully understand and analyze the posts. On the other hand, a seed value may alternatively be provided for each post, with a moderation process being applied to rectify any misclassification. Additionally, because users do not typically apply strict rules to the linguistic content of posts in online discussion forums, linguistically-involved approaches can be avoided.

Accordingly, a set of 22 features are described below. As noted herein above, these 22 features may be divided into five feature groups: (I) relevance (2); (II) originality (2); (III) forum-specific (7); (IV) surface (5); and (V) posting component features (6). These features are described below in the context of their corresponding feature groups. It should be understood that these descriptions are made by way of example and that different embodiments may alternative be implemented.

I. Relevance Feature Group

Relevance of a given post is an aspect that affects the perception of users. Relevance reflects the appropriateness of a post to the thread and the sub-forum it inhabits. To approximate both these aspects, two features, OnSubForumTopic and OnThreadTopic, are evaluated as follows:

OnSubForumTopic

In an example implementation, OnSubForumTopic captures the degree to which a post has remained relevant to the sub-forum it resides within. While in many contexts a set of keywords may be formulated from prior knowledge, community dynamics within online discussion forums may shift, which can render preset keywords less relevant. To overcome this phenomenon, keywords are generated from within the forum content as it evolves. This is achieved by generating a set of keywords that are distinct in each sub-forum from others existing in the same forum.

These keywords are generated using a BOW approach by combining the words of posts in the sub-forum. These keywords represent the communal perception of important terms that distinguish the given sub-forum within the online discussion forums. The top 10% of these keywords ($F_N$) are used to represent the knowledge of the given sub-forum. The BOW of each post in the sub-forum ($P_j$) is then compared against the keywords descriptive of the sub-forum to generate the onSubForumTopic measure for the jth posting.

Thus, OnSubForumTopic(Pj) may be calculated as follows:

$$OnSubForumTopic\ (P_j) = \frac{count(P_j \in F_N)}{|P_j|} \forall\ j = 1\ ...\ n,$$

where n is the number of posts in the sub-forum, $P_j$ is the set of words in the jth post's body and title, and $F_N$ is the sub-forum's knowledge base.

OnThreadTopic

Because the leading post in a thread and its title are the entry point to any threaded discussion, maintaining relevance to both these components signifies that users can find information with relative ease. Therefore, OnThreadTopic is used to measure the relevance of a post to the discussion it is in by comparing each post's BOWs to that of the leading post according to the following equation:

$$OnThreadTopic\ (P_j) = \frac{count(P_j \in P_1)}{|P_j|} \forall\ j = 2\ ...\ n.$$

The leading post of the thread is treated specially, and its OnThreadTopic measure follows the following equation:

$$OnThreadTopic\ (P_1) = \frac{count(body(P_1) \in title(P_1))}{|P_1|},$$

where body($P_1$) is the set of words in the lead post's body, and title($P_i$) is the set of words in the post's title.

II. Originality Feature Group

Because posts that contribute new knowledge are perceived to be of value, originality goes hand-in-hand with relevance in indicating the value of a given post. While originality is hard to measure, a degree of similarity is significantly easier to realize. Although the lack of similarity may not be an exact reflection of originality, it can provide an acceptable indication of the novelty presented by a given post. Two measures of originality are described, OverlapPrevious and OverlapDistance.

OverlapPrevious

This feature measures the maximum degree of overlap between the terms used in a posting and the other posts that precede it in the same thread. While the order of terms is generally perceived as important in other contexts, the nature of posting content is relatively short and less-structured, which jointly reduce the importance of word order. As a result, the overlap between the words of a given post and its previous posts may be calculated as follows:

$$Overlap\ (P_i, P_j) = \frac{count(P_i \in P_j)}{|P_i|} \forall\ i > j,\ j = 1\ ...\ n.$$

Therefore, OverlapPrevious($P_i$) may be evaluated as:

$$OverlapPrevious\ (P_i) = \max_j(Overlap(P_i, P_j)).$$

OverlapDistance

This feature reflects the separation distance, in terms of number of posts, between a given current post and the post that has been judged as the most overlapping by the OverlapPrevious measure. The reasoning is that the closer the overlapping posts are, the less value the given post contributes.

III. Forum-Specific Feature Group

There are a few aspects of a given post that are usually specific to online discussion forums, including the number of times a post is quoted and the amount of discussion a post stimulates. The features used to capture these aspects are Referencing and Replies.

Referencing

Quotation of text chunks from previous posts, and by subsequent posts, increases the value of a given post to a discussion. Furthermore, the method of referencing text may signify its importance. For example, utilizing fragments of text, rather than full posts, and adding comments around the fragments indicate more focused posts. Additionally, the amount of text quoted from a given post relative to its overall content reflects the amount of contribution present. A ratio of quoted text to the post size, as normalized by the size of the original post, is used to evaluate individual chunks.

Because quotation is a direction measure, two feature pairs are evaluated for a given post. These feature pairs are CountBackwardReferences and BackwardReferencing in one direction, and CountForwardReferences and ForwardReferencing in the other direction.

CountBackwardReferences

This measure represents the number of quotation chunks in the given post that are extracted from earlier posts.

BackwardReferencing

This feature aims to quantify the value added to a given post by the quotations it contains. It may be calculated according to the following equation:

$$BackwardReferencing\ (P_{i,j}) = \sum_i \left( \frac{\text{size of quoted text}}{|P_i|} \times \frac{\text{size of quoted text}}{|P_j|} \right).$$

CountForwardReferences

This measure represents the number of times the post has been referenced in subsequent posts.

ForwardReferencing

This feature aims to reflect the value added by a given post to subsequent posts that quote the given post. It may be calculated according to the following equation:

$$ForwardReferencing\ (P_j) = \sum_i \left( \frac{\text{size of quoted text}}{|P_i|} \times \frac{\text{size of quoted text}}{|P_j|} \right).$$

Replies

The number of replies generated by a given post is an indication of its value, either through direct contribution or controversy. The number of replies reflects users' interest in a given post. In cases in which the nesting of replies is allowed, the number of levels spanned by replies to the post may also be factored into the analysis.

IV. Surface Feature Group

Surface features reflect the way a user presents a given post, irrespective of the content. The amount of care an individual user gives to a post affects the way readers perceive its value. The more readers find the given post relatively easy to read, the greater the value they associate to the post. Three metrics are used to assess surface features, namely Timeliness, Lengthiness, and Formatting Quality.

Timeliness

This feature is a reflection of how fast a user presents his/her contribution. The rate of replies is dictated by the community, and falling within its norm increases the probability of posts being viewed. To reflect this aspect, timeliness may be calculated as follows:

$$Timeliness\ (P_j) = \frac{\text{time difference between } P_j \text{ and } P_{j-1}}{\text{Average inter-posting time in thread}}.$$

Lengthiness

Similar to Timeliness, this measure is associated with the length of a post, which is measured by word count. A post conforming to a posting length that is accepted by the community as being normal reflects value. Hence, the length of a given post may be normalized by the average (e.g., mean) length of posts in a particular thread as follows:

$$Lengthiness\ (P_j) = \frac{|P_j|}{\text{Average length of postings in thread}}.$$

Formatting Quality

Aspects involved in post formatting affect the perception of users as to the value of a given post. The "excessive" use of punctuation marks, emoticons, consecutive capital letters, etc. generally reduces the level of professionalism of posts. This reduced professionalism undermines their value. These three aspects are reflected using three features, namely FormatPunctuation, FormatEmoticons, and FormatCapitals. Collectively, they form the measures of formatting quality.

FormatPunctuation

The reasoning behind this feature is that extensive use of creative punctuation affects the perceptions of the post by other users. For this reason, FormatPunctuation($P_j$) may be calculated as follows:

$$FormatPunctuation\ (P_j) = \frac{\text{number of chunks of consecutive punctuations in posting } j}{\text{number of sentences in posting } j}.$$

FormatEmoticons

The reasoning behind this feature is that extensive use emoticons in a given post conveys a level of emotion that affects the perceptions of the post by other users. For this reason, FormatEmoticons($P_j$) may be calculated as follows:

$$FormatEmoticons\ (P_j) = \frac{\text{number of emoticons in posting } j}{\text{number of sentences in posting } j}.$$

The set of emoticons that are considered may be predefined.

FormatCapitals

The reasoning behind this feature is that extensive use of consecutive capital letters gives the post a tone that might affect its perception by other users. For this reason, FormatCapitals($P_j$) may be calculated as follows:

$$FormatCapitals\ (P_j) = \frac{\text{number of chunks of consecutive capitals in posting } j}{\text{number of sentences in posting } j}$$

V. Posting Component Feature Group

A given post may contain relevant syntactic and web elements, such as questions and web-links respectively. Although most dialogues on online discussion forums revolve around questions, web-links add value and credibility to posts by soliciting the value of the referenced content. These two forum aspects are captured by two metrics, WebLinks and Questioning.

Weblinks

The presence of appropriate web-links generally adds value to posts. This value is composed of at least three factors:

(i) the relevance of the web-link, (ii) the presentation of the web-link, and (iii) the added value contributed by the user through explaining the relevance of the web-link. These three factors comprise a set of two measures to assess the value of web-links that are present in posts. These two measures are named Weblinking and WeblinkQuality.

Weblinking

This feature represents the aspects of how much effort the user puts forth in the presentation of the web-links in the post. It may be calculated as follows:

$$\text{Weblinking } (P_j) = \frac{\sum_{AllWeblinks} \text{number of sentences with weblinks in post } j}{\text{number of sentences in post } j} \times WeblinkFormat,$$

where $$WeblinkFormat = \begin{cases} 1 & \text{if URL is inserted} \\ 0.5 & \text{if hyperlinked text} \end{cases}.$$

WeblinkQuality

Because the user is presenting the web-link in a given post as an additional resource, value is added if its content is relevant to the general content of the sub-forum the post is in. Therefore, this feature measures the similarity between the words in the webpage linked to and the sub-forum the post is in. This may be captured as follows:

$$OnForumTopic (P_j) = \sum_{\forall \, weblinks} \frac{\text{count}(WebPage \text{ words} \in F_N)}{|WebPage \text{ words}|},$$

where $F_N$ is the sub-forum's knowledge base, e.g. its representative set of keywords.

Questioning

Questions, and subsequently their answers, are one of the major components of online discussion forums. In order to capture their value, a set of three question-related features are included. The first feature is the number of questions in a given post. The presence of questions in a post is detected based on a set of templates both from the surface form of the sentences (e.g., question mark and Wh-questions) and the part of speech (POS) tags of words surrounding a Wh-question word (e.g., which). The reasoning behind including POS tags is to increase the precision of question detection to overcome situations like: "I mean what you heard".

The second and third question features aim at capturing the intuition that if a question "A" asked in a post $P_j$ is similar to a previously asked question in the forum, then the intrinsic value of post $P_j$ is reduced. Hence, a distance measure between the question in the current post and questions previously encountered in the forum is included. In an example implementation, the questions posted in the forum are indexed. A search engine is used to compute a question distance measure from the index. To allow for multiple questions in the same post, the average and standard deviation of distance measures over the set of questions in a given post is used as the second and third question-related features.

Figure 5:
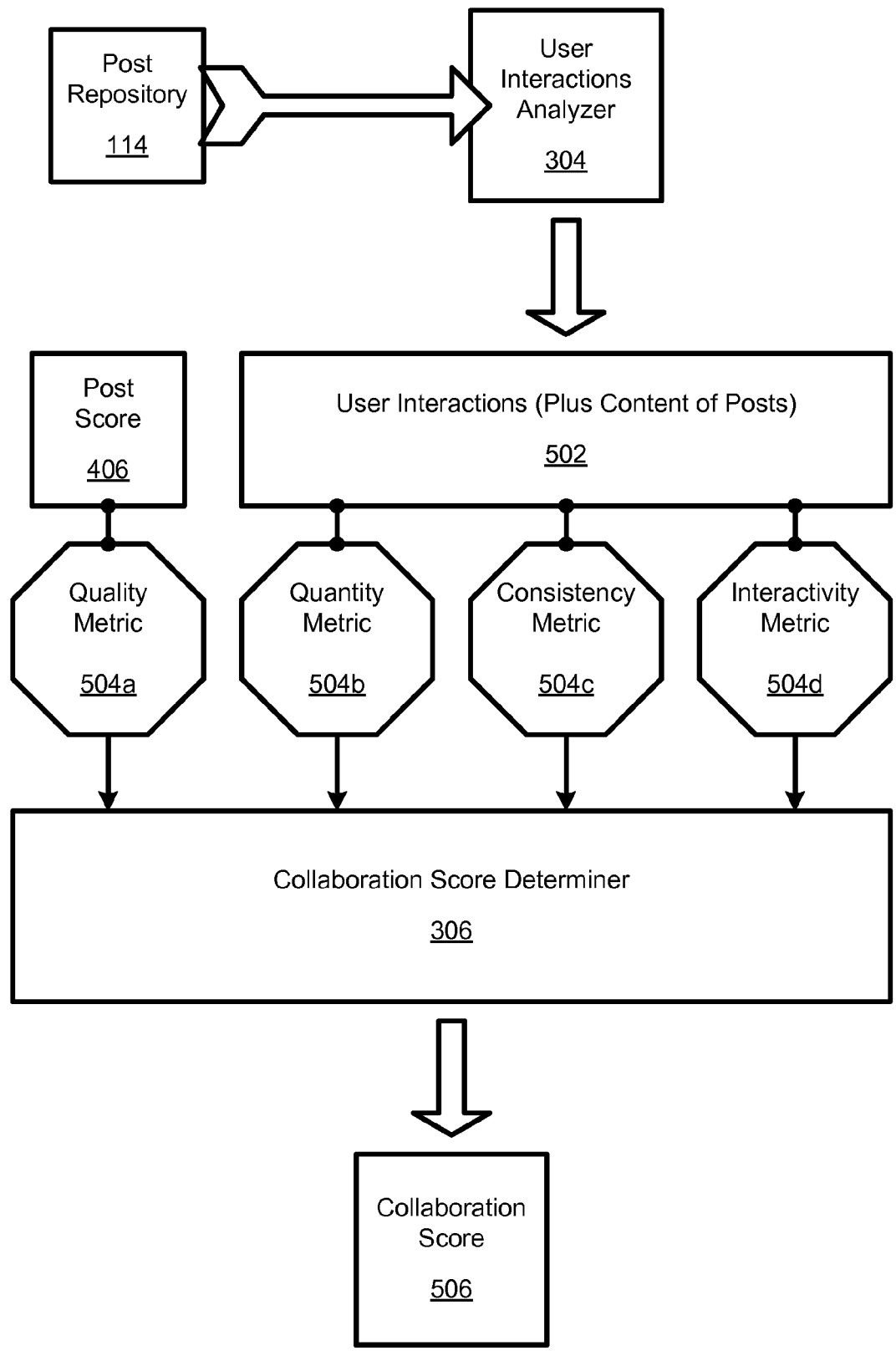
FIG. 5 is a block diagram that illustrates operations for an example user interactions analyzer and an example collaboration score determiner.

FIG. 5 is a block diagram that illustrates operations 500 for an example user interactions analyzer 304 and an example collaboration score determiner 306. As illustrated, example operations 500 also include post repository 114 and post score 406. Operations 500 further include user interactions 502, multiple metrics 504, and a collaboration score 506.

Although four metrics 504 are shown, more or fewer metrics 504 may alternatively be employed. By way of example only, the four illustrated metrics 504 may include: a quality metric 504a, a quantity metric 504b, a consistency metric 504c, and an interactivity metric 504d.

In an example embodiment, posts 110 (of FIGS. 1 and 4) of post repository 114 are provided to user interactions analyzer 304. User interactions analyzer 304 analyzes the interactions that are apparent or determinable from posts 110 to produce user interactions 502. User interactions 502 may include, but are not limited to, the following: how many posts a user submits and to which topics or threads; which users jointly contribute to a given forum, topic, or thread; which user(s) respond to the questions of a particular user; which users' questions does a particular user respond to; what types of posts (e.g., initial, question, answer, etc.) a user submits; and so forth. User interactions 502 may also include content from the posts. The content may be textual excerpts from the posts, extracted topics, a full text version, some combination thereof, and so forth.

More specifically, user interaction may be modeled as follows. The interactions between the different users within an online discussion forum are modeled to identify the relationships that develop between users and/or content. For example, user interactions analyzer 304 (and/or a dashboard creator 106) may generate interactivity graphs between (and among) different users and between (and among) different keywords and topics that exist within the online forum. Through these interactivity graphs, user roles and content popularity are amongst the knowledge that is surfaced. These graphs may model dimensions of users and content, along with posting quality, quantity, and interactivity.

In an example embodiment, multiple metrics 504 are applied to collaboration score determiner 306. Responsive to these metrics 504, collaboration score determiner 306 determines collaboration score 506. Quality metric 504a relates to respective post scores 406 for respective posts 110 and/or respective aggregated post scores 406 for respective users 108. Quantity metric 504b, consistency metric 504c, and interactivity metric 504d relate to user interactions 502.

Through the development of collaboration score 506, the top collaborators amongst the users can be surfaced. Thus, a collaboration score may be calculated as a combination of any one or more of the following four metrics: (i) posting quality, (ii) the relative quantity of an individual user's contributions, (iii) posting consistency, and (iv) interactivity. The multiple metrics 504 that are applied to collaboration score determiner 306 are described below. More specifically, they are described for certain example embodiments in terms of how they affect the determination of collaboration score 506 when each is applied to the determination.

The quality aspect for quality metric 504a is assessed using the average (e.g., median) of post scores 406 that are attained at the thread level. The thread level score of a user is a reflection of the individual posts a user has contributed, and it is valued as the average (e.g., median) score for each thread. The higher the posting quality of user contributions to the forum, the more credibility the user accumulates.

The relative volume of contributions from an individual user, compared to other forum members, indicates a measure of quantity for quantity metric 504b. This factor may further distinguish between the threads an individual user has initiated and the threads to which the individual user has contributed. The rank of a given user in comparison to other members of the forum reflects a numeric value for posting quantity.

The consistency of the post contributions submitted by an individual user is an indication of the value provided to a forum by the individual user. The more consistently an individual user contributes to a forum over a particular time period the more value the individual user adds. It is considered that users who contribute regularly to the forum add more value as compared to those who demonstrate a burst-like activity pattern (e.g., at the beginning or end of the particular time period). Monitoring a changing frequency at which a user contributes as impacted by any burst periods can be used to form consistency metric 504c.

Online discussion forums are venues for interactivity between and amongst users. The more members of the forum a given user engages, the more credibility the given user provides. Engagement is assessed on two levels. A first level is based on the number of participants in the threads a user contributes to relative to the total number of participants in the forum. A second level is based on the number of threads a user posts in. An average (e.g., median) number of users as normalized by the total number of users in the forum may be used as an indicator for an interactivity metric 504d.

A weighted sum of metrics 504 may be used to generate an overall collaboration score 506 for each user. Users that regularly post high volume, high quality posts and that engage many other users attain a relatively high collaboration score. Analysis of user participation in and contribution to online discussion forums represents a mechanism to assess the value they add to the community. It can also serve as a mechanism to direct participation and improve performance and engagement of users in these discussions. This is analogous to the user karma, or credibility, in an online discussion community.

These observations are now applied to an educational environment specifically, such as when the community being addressed is in the context of a classroom. Students and instructors alike can understand the means by which they would be more effective in the learning process. However, given the inherent subjectivity of evaluation across instructors, classes, seniority, subject-matters, etc., different situations may lead to placing different relative values on metrics 504.

Accordingly, an example embodiment enables the instructor to weight metrics 504a,b,c,d as he/she sees fit. For instance, a professor of first year students might be more interested in encouraging the students to contribute regardless of other factors, in which case the professor may place more weight to quantity metric 504b. An example user interface for this is shown in FIG. 8C and described herein below. It should be understood that the ability to weight metrics 504 may be implemented in environments other than educational ones.

Figure 6:
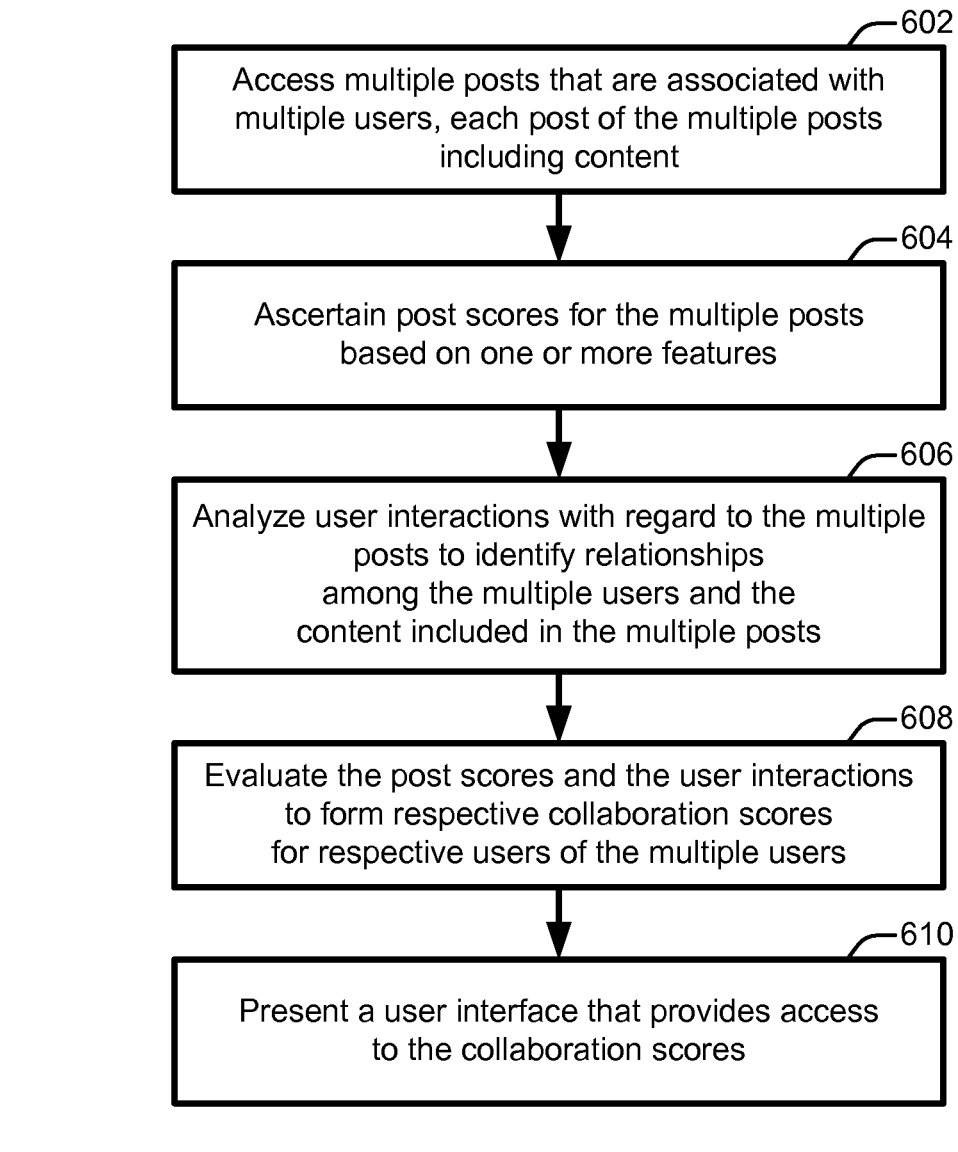
FIG. 6 is a flow diagram that illustrates an example of a method for evaluating users in a collaborative online forum.

FIG. 6 is a flow diagram 600 that illustrates an example of a method for evaluating users in a collaborative online forum. Flow diagram 600 includes five blocks 602-610. Implementations of flow diagram 600 may be realized, for example, as processor-executable instructions and/or as part of collaboration evaluator 104 and/or dashboard creator 106. Example embodiments for implementing flow diagram 600 are described below in conjunction with the description of FIGS. 1, 3, 4, and 5.

Figure 9:
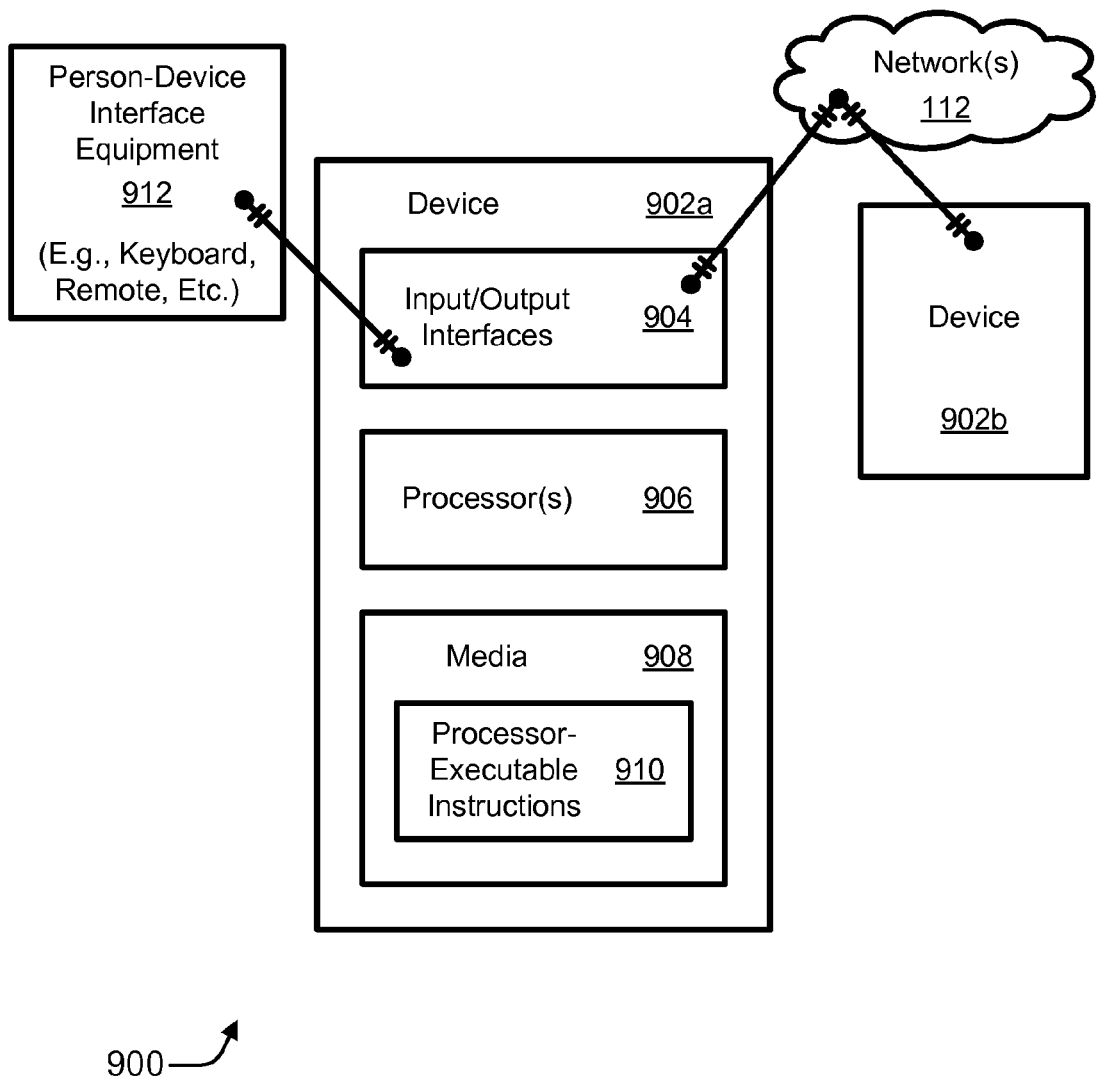
FIG. 9 is a block diagram illustrating example devices that may be used to implement embodiments for evaluating users in a collaborative online forum.

The acts of flow diagram 600 that are described herein may be performed in many different environments and with a variety of different devices, such as by one or more processing devices (e.g., of FIG. 9). The order in which the method is described is not intended to be construed as a limitation, and any number of the described blocks can be combined, augmented, rearranged, and/or omitted to implement a respective method, or an alternative method that is equivalent thereto. Although specific elements of certain other FIGS. are referenced in the description of this flow diagram, the method may be performed with alternative elements.

For example embodiments, at block 602, multiple posts that are associated with multiple users are accessed, with each post of the multiple posts including content. For example, multiple posts 110 that include content and that are associated with multiple users 108 may be accessed by a collaboration evaluator 104.

At block 604, post scores for the multiple posts are ascertained based on one or more features. For example, post scores 406 for multiple posts 110 may be ascertained based on one or more features 404 by a post score ascertainer 302. At block 606, user interactions with regard to the multiple posts are analyzed to identify relationships among the multiple users and the content included in the multiple posts. For example, user interactions with regard to multiple posts 110 may be analyzed by a user interactions analyzer 304 to identify relationships among multiple users 108 as well as the content included in multiple posts 110.

At block 608, the post scores and the user interactions are evaluated to form respective collaboration scores for respective users of the multiple users. For example, post scores 406 and user interactions 502 may be evaluated by a collaboration score determiner 306 to form respective collaboration scores 506 for respective ones of users 108. At block 610, a user interface that provides access to the collaboration scores is presented. For example, a user interface (e.g., a dashboard 116) may be presented by dashboard creator 106 to provide for a supervisor 118 to access collaboration scores 506.

FIG. 7 is a block diagram that illustrates an operation 700 for an example dashboard creator 106. As illustrated, example operation 700 includes dashboard creator 106, dashboard 116, user interactions 502, and collaboration scores 506. Dashboard creator 106 includes an interactivity graph builder 702.

In an example embodiment, dashboard creator 106 takes as input user interactions 502 and collaboration scores 506. As described herein above with particular reference to FIG. 5, user interactions 502 are produced by user interactions analyzer 304 from multiple posts 110. User interactions 502 may also include all or a portion of the content of these posts 110. Alternatively, dashboard creator 106 may be given direct access to posts 110 to retrieve the content thereof. From user interactions 502 and/or collaboration scores 506, dashboard creator 106 creates a dashboard 116.

Dashboard 116 may be created and/or modified in response to commands from a supervisor 118. Example elements that may be included as part of dashboard 116 are described herein below with particular reference to FIGS. 8A-8D. One type of such elements is the interactivity graph. Each interactivity graph is built by interactivity graph builder 702. Examples of interactivity graphs include, but are not limited to, graphs that depict interactions between users, graphs that depict interactions between forum topics, graphs that depict interactions between threads, combinations thereof, and so forth.

Several facets of interaction may be depicted. By way of example only, such facets of interaction may include: which items are involved in interactions with which other items, the strength of such interactions, combinations thereof, and so forth. Interactivity graphs may also indicate other information, such as contribution sizes, popularity magnitudes, etc., of the items (e.g., users, threads, topics, etc.) to which the graphs are directed.

In certain example embodiments, dashboard 116 may be divided into customizable modules. In such a modular dashboard, an overall summary of the online discussion forum may be provided, in addition to allowing the monitoring and evaluation of a specific user via their individual profile page. A dashboard may bring together different applications that are derived, in part, from the automatic scoring of postings. These different applications may summarize the value of the users' collaboration and, in the process, identify the users that deserve recognition for their efforts and those whose performance is lacking and may need attention from the supervisor.

Example customizable modules for a dashboard include, but are not limited to, search, interactivity graphs, top collaborators, forum statistics, and so forth. For an example search module, the supervisor is able to search for a user and subsequently access their individual profile page. This module may also list the users of the forum in a table that is orderable by each of the metrics that comprise their collaboration score. An example interactivity graph module enables the supervisor to visualize the volume and value of the content submitted by users in posts as well as to identify relationships that develop between them.

For an example top collaborators module, the top performing users (e.g., those who have attained the highest collaboration scores) are presented. The supervisor may be empowered to specify the number or percentage of students that he/she would like to surface. An example forum statistics module presents the overall forum activity. For instance, the number of posts over time may be charted as part of the overall forum activity.

Figure 8A:
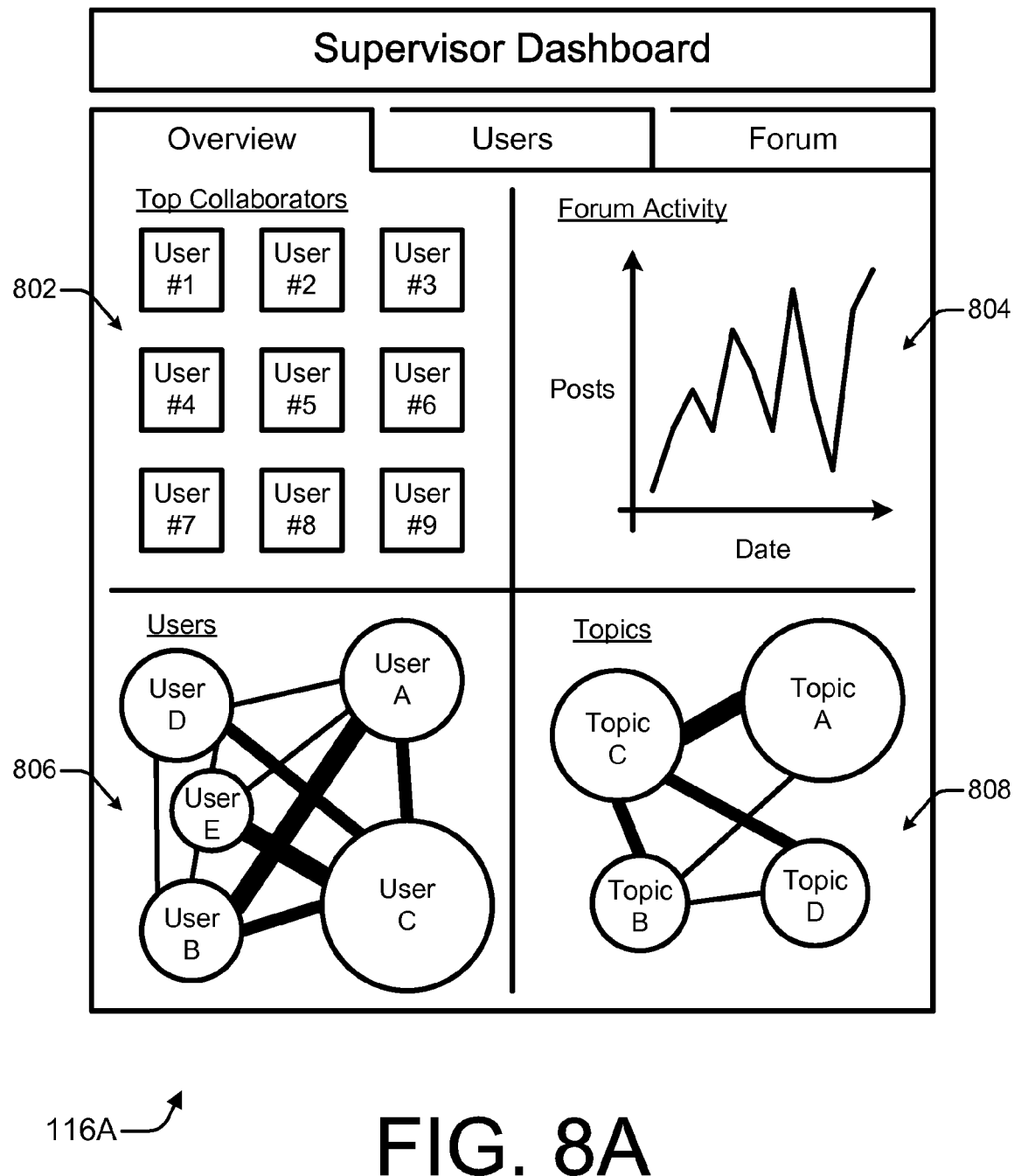
FIG. 8A illustrates a dashboard user interface that depicts an example overview mode.
Figure 8B:
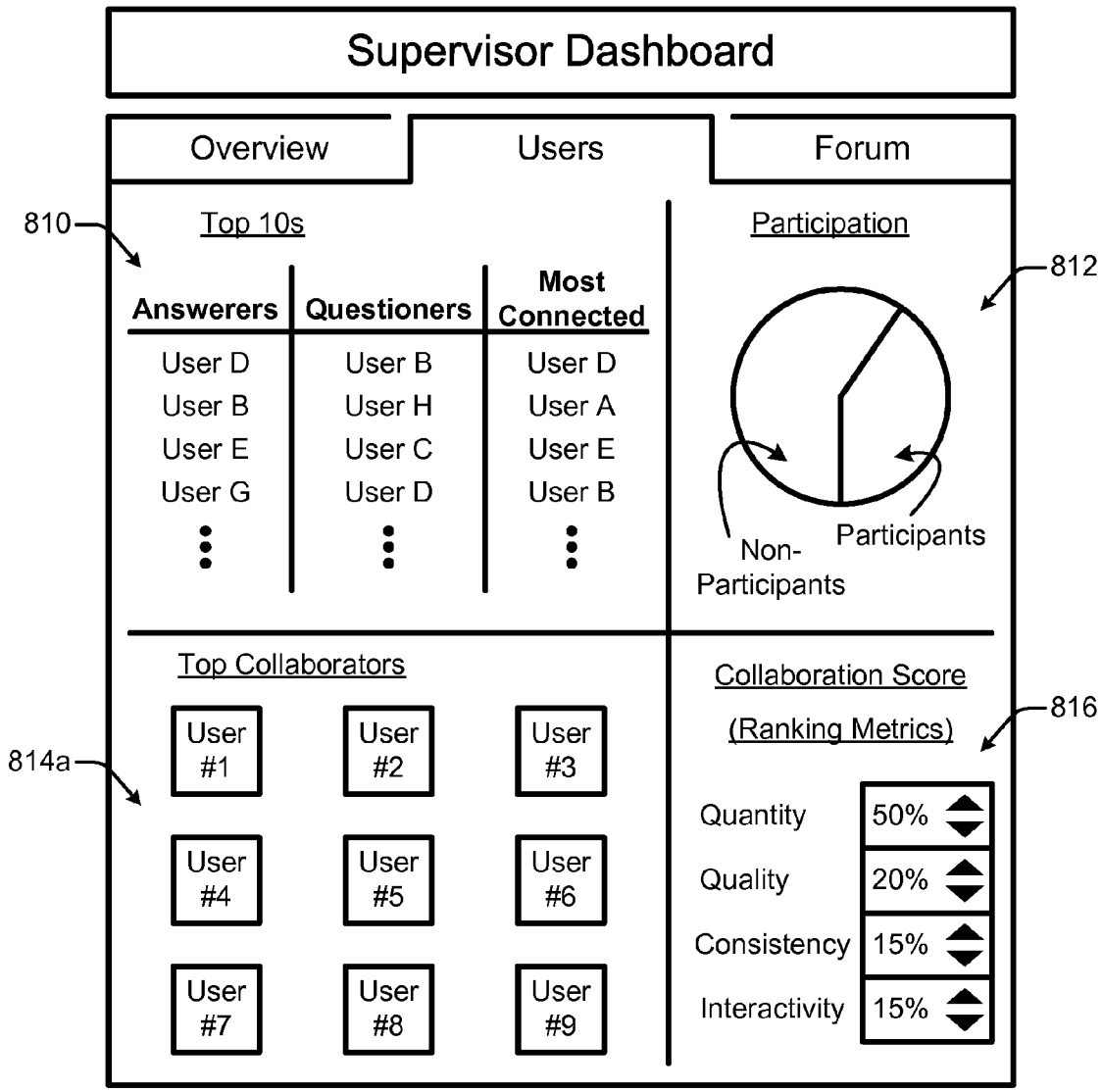
FIG. 8B illustrates a dashboard user interface that depicts an example user mode.
Figure 8C:
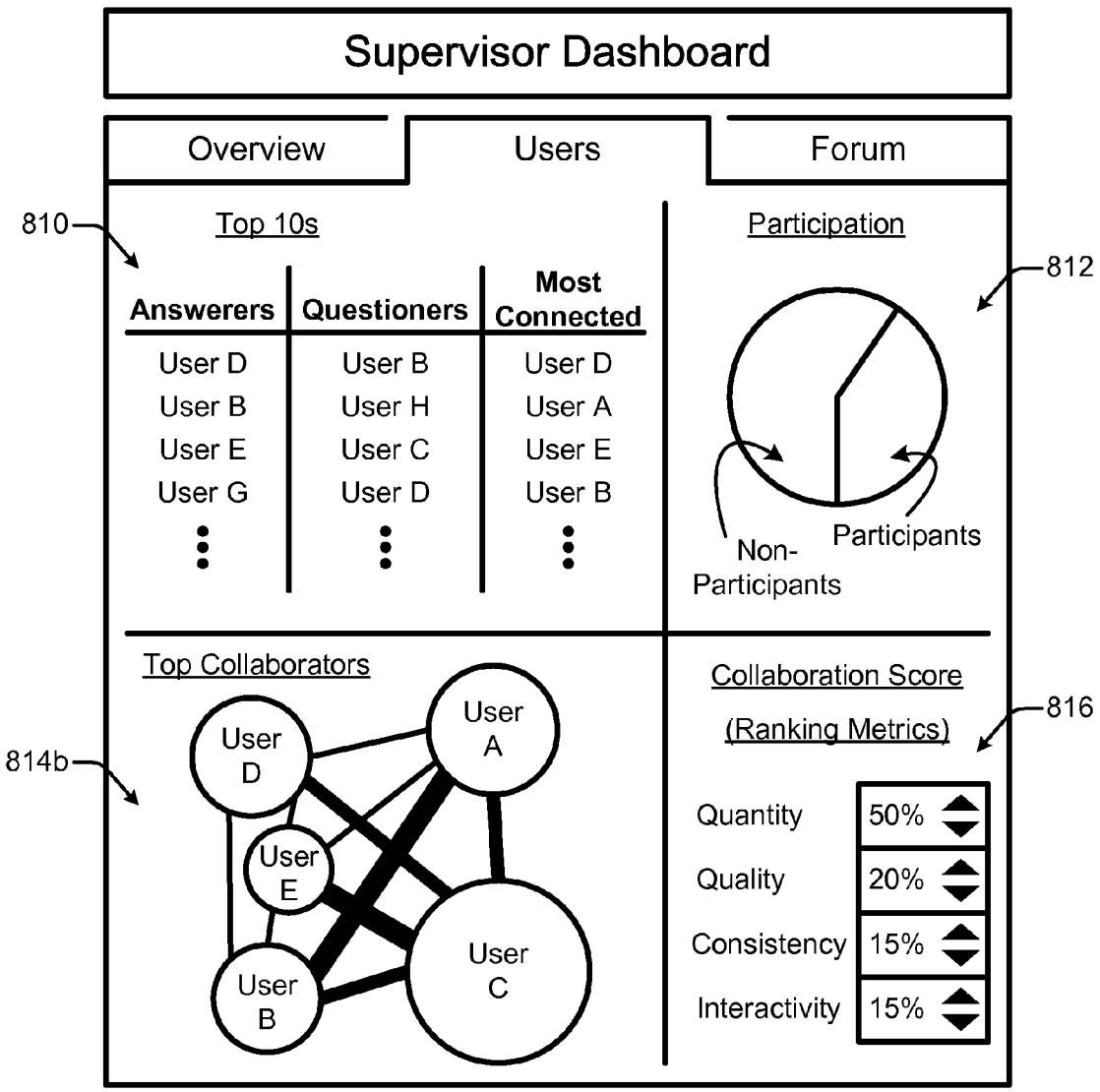
FIG. 8C illustrates a dashboard user interface that depicts another example user mode.
Figure 8D:
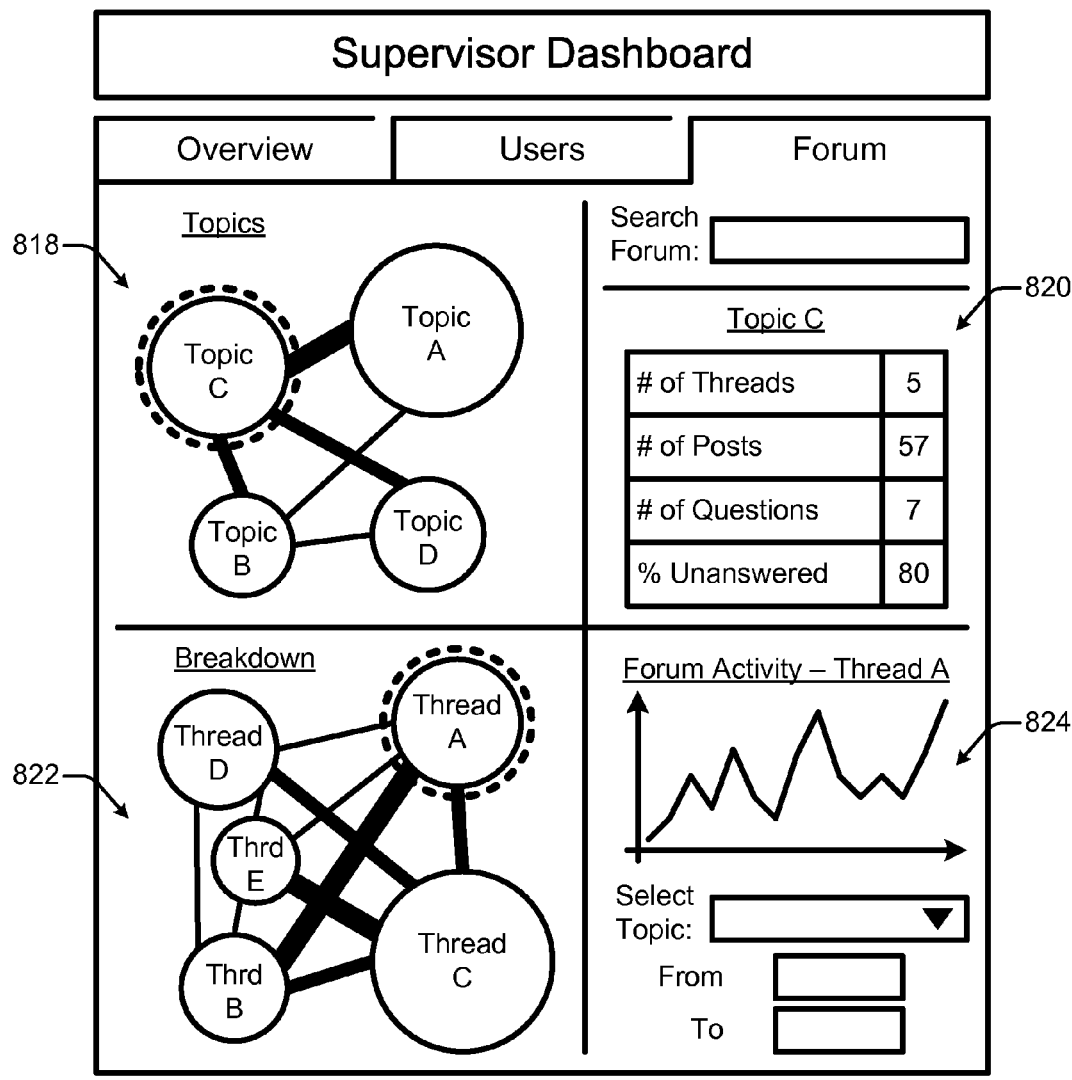
FIG. 8D illustrates a dashboard user interface that depicts an example forum mode.

FIGS. 8A, 8B, 8C, and 8D illustrate an example dashboard 116 that may be accessed by a supervisor to review forum data generally and collaboration indicia specifically. In an example embodiment, each dashboard 116 includes three tabs: an overview tab, a users tab, and a forum tab. FIG. 8A is directed to an example implementation of the overview tab. FIGS. 8B and 8C are directed to example implementations of the users tab. FIG. 8D is directed to an example implementation of the forum tab.

Different information is incorporated into the different dashboard implementations. Each dashboard implementation is divided roughly into four quadrants, which may be of different or similar sizes. However, each tab may be separated into more or fewer than four sections, and the sections need not be rectangular. Furthermore, the overall layouts may be organized differently from those that are illustrated.

FIG. 8A illustrates a user interface dashboard 116A that depicts an example overview mode. For an example embodiment, four quadrants of dashboard 116A include: top collaborators quadrant 802, forum activity quadrant 804, users quadrant 806, and topics quadrant 808.

With top collaborators quadrant 802, "n" different users that are associated with the "n" highest collaboration scores are shown in ranked order by icon (e.g., name with student photo). The variable "n" maybe any integer; it is nine as shown. Alternatively, a different number and/or a different layout may be implemented for displaying the top collaborators. With forum activity quadrant 804, a diagram is displayed that graphs the date versus the number of posts. The diagram indicates how the number of postings being made changes over time.

With users quadrant 806, an interactivity graph is displayed. Hence, the items being graphed with their interactions being indicated are users. Five users A, B, C, D, and E are shown. By way of example, these users may be the top five collaborators. They may alternatively be selectable by the supervisor. The interactions are indicated by lines that interconnect any two users that have interacted with each other.

The sizes of contributions from the multiple users may be represented by the interactivity graph. Additionally, the strengths of the interactions between and among the multiple users may be represented as well. By way of example only, the size of the contribution from each user may be represented by the size of the circle representing the user, and the thickness of the interconnecting line between any two users may represent the strength of the interaction between them. Other geometric shapes for the users and other representation approaches may alternatively be implemented.

With topics quadrant 808, an interactivity graph that is directed to topics is displayed. In other words, interactivity (e.g., interactions and interrelationships) between and among different identified forum topics are represented by the interactivity graph. Four topics A, B, C, and D are shown. The topics are extracted from the content of the multiple posts. This interactivity graph that is incorporated into the supervisor dashboard represents magnitudes of popularity for the multiple topics and represents strengths of interactions between and among the multiple topics. The magnitudes of popularity are represented by the sizes of the circles, and the strengths of the interactions are represented by the thickness of the interconnecting lines.

FIG. 8B illustrates a user interface dashboard 116B that depicts an example user mode. For an example embodiment, four quadrants of dashboard 116B include: top 10s quadrant 810, participation quadrant 812, top collaborators quadrant 814a, and collaboration score quadrant 816.

With top 10s quadrant 810, the top 10 collaborators in a number of different interaction categories are presented. In other words, the user interface includes an ability to display a listing of top collaborators for different interaction categories. Example interaction categories include, but are not limited to, answerers, questioners, most connected, and so forth. In the illustrated listing, User D has provided the most answers, User B has asked the most questions, and User D has established the most connections. These listings for these interaction categories may be determined by collaboration evaluator 104 and/or by dashboard creator 106.

With participation quadrant 812, the number and/or percentage of user participants and user non-participants are presented. With the illustrated example, a pie chart is used to show the relative percentages of participants and non-participants. Actual numerical values for the numbers and/or percentages may also be displayed.

With top collaborators quadrant 814a, the "n" users with the "n" highest collaboration scores are displayed in a listing format, with or without representative icons. Top collaborators quadrant 814a may be similar to top collaborators quadrant 802 (of FIG. 8A). Although not shown, top collaborators quadrant 814a may include one or more icons enabling the supervisor to switch display modes from a top collaborator listing (as shown in FIG. 8B) to a top collaborator interactivity graph (as shown in quadrant 814b of FIG. 8C).

With collaboration score quadrant 816, four ranking metrics are shown with corresponding weights. Specifically, quantity, quality, consistency, and interactivity metrics are shown. As described herein above, collaboration score determiner 306 (of FIGS. 3 and 5) determines collaboration scores 506 for multiple users 108 responsive to multiple ranking metrics 504. Dashboard creator 106 (of FIGS. 1 and 7) presents a user interface that enables a supervisor 118 to adjust relative percentage values of the ranking metrics that are to be used by collaboration score determiner 306. In other words, the supervisor is empowered to change the weighting of each metric that is used in the determination of the collaboration scores.

FIG. 8C illustrates a user interface dashboard 116C that depicts another example user mode. For an example embodiment, four quadrants of dashboard 116C include: top 10s quadrant 810, participation quadrant 812, top collaborators quadrant 814b, and collaboration score quadrant 816. Dashboard 116C is similar to dashboard 116B (of FIG. 8B) except that top collaborators quadrant 814b displays an interactivity graph of the top collaborative users instead of a listing.

Thus, with top collaborators quadrant 814b, the "n" users with the "n" highest collaboration scores are displayed in an interactivity graph format. Although not shown, an icon may also be included to enable zooming into and out of the interactivity graph of top collaborators quadrant 814b (or any other interactivity graph). Also, each respective user icon may be coded (e.g., by shape, color, texture, etc.) to indicate the value that the respective user provides to the forum. Analogously, the icons for other items (e.g., topics, threads, etc.) in other interactivity graphs may also be coded to indicate value.

FIG. 8D illustrates a user interface dashboard 116D that depicts an example forum mode. For an example embodiment, four quadrants of dashboard 116D include: topics quadrant 818, topic detail quadrant 820, thread breakdown quadrant 822, and thread detail quadrant 824.

With topics quadrant 818, an interactivity graph for topics is displayed. By way of example, the included topics A, B, C, and D may be the "m" topics having the greatest popularity, with "m" being some integer, or may be selectable by the supervisor. The supervisor is also empowered to select a topic to receive additional information about it.

With topic detail quadrant 820, details are displayed for the topic that is selected in topics quadrant 818. In the illustrated example, Topic C is selected. Example topic details for Topic C are: number of threads, number of posts, number of questions, percent unanswered, and so forth. However, more, fewer, and/or a different set of topic details may alternatively be displayed. Within topic detail quadrant 820, a forum search box is included that enables a supervisor to search collaboration data and/or the content of the posts. The forum search box may alternatively be located in a different quadrant and/or tab.

With thread breakdown quadrant 822, an interactivity graph for threads is displayed. Specifically, five threads A, B, C, D, and E are displayed. The five largest threads may be displayed, or the supervisor may select desired threads. Although five are shown, a different number may be included in a given interactivity graph.

Similarly to other described interactivity graphs, the thread interactivity graph also includes a respective icon (e.g., a geometric circle) for each respective thread. Additionally, the size of the threads and the strength of the interactions may be reflected in the interactivity graph using, e.g., the size of the displayed icon and the thickness of the interconnecting lines, respectively. The supervisor is empowered to select a particular thread to see additional details about the thread.

With thread detail quadrant 824, there is a diagram corresponding to the thread selected in thread breakdown quadrant 822. The diagram graphs time versus the number of posts for the selected thread. The time period for the graph may be selected by the supervisor as indicated by the "From" and "To" blocks. Other aspects of forum activity may be made accessible through thread detail quadrant 824. For example, topics may be selected using the drop-down menu box with the selected topic becoming the focus of the graph.

FIG. 9 is a block diagram 900 illustrating example devices 902 that may be used to implement embodiments for user evaluation in a collaborative online forum. As illustrated, block diagram 900 includes two devices 902a and 902b, person-device interface equipment 912, and one or more network(s) 112 (also of FIG. 1). As explicitly shown with device 902a, each device 902 may include one or more input/output interfaces 904, at least one processor 906, and one or more media 908. Media 908 may include processor-executable instructions 910.

For example embodiments, device 902 may represent any processing-capable device. Example devices 902 include, but are not limited to, personal or server computers, hand-held or other portable electronics, entertainment appliances, network components, some combination thereof, and so forth. Device 902a and device 902b may communicate over network(s) 112. Network(s) 112 may be, by way of example but not limitation, an internet, an intranet, an Ethernet, a public network, a private network, a cable network, a digital subscriber line (DSL) network, a telephone network, a wireless network, some combination thereof, and so forth. Person-device interface equipment 912 may be a keyboard/keypad, a touch screen, a remote, a mouse or other graphical pointing device, a display screen, a speaker, and so forth. Person-device interface equipment 912 may be integrated with or separate from device 902a.

I/O interfaces 904 may include (i) a network interface for monitoring and/or communicating across network 112, (ii) a display device interface for displaying information on a display screen, (iii) one or more person-device interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, and so forth. Examples of (iii) person-device interfaces include those that communicate by wire or wirelessly to person-device interface equipment 912. A given interface may function as both a display device interface and a person-device interface.

Processor 906 may be implemented using any applicable processing-capable technology, and one may be realized as a general-purpose or a special-purpose processor. Examples include a central processing unit (CPU), a microprocessor, a controller, a graphics processing unit (GPU), a derivative or combination thereof, and so forth. Media 908 may be any available media that is included as part of and/or is accessible by device 902. It includes volatile and non-volatile media, removable and non-removable media, storage and transmission media (e.g., wireless or wired communication channels), hard-coded logic media, combinations thereof, and so forth. Media 908 is tangible media when it is embodied as a manufacture and/or as a composition of matter.

Generally, processor 906 is capable of executing, performing, and/or otherwise effectuating processor-executable instructions, such as processor-executable instructions 910. Media 908 is comprised of one or more processor-accessible media. In other words, media 908 may include processor-executable instructions 910 that are executable by processor 906 to effectuate the performance of functions by device 902. Processor-executable instructions 910 may be embodied as software, firmware, hardware, fixed logic circuitry, some combination thereof, and so forth.

Thus, realizations for user evaluation in a collaborative online forum may be described in the general context of processor-executable instructions. Processor-executable instructions may include routines, programs, applications, coding, modules, protocols, objects, components, metadata and definitions thereof, data structures, APIs, etc. that perform and/or enable particular tasks and/or implement particular abstract data types. Processor-executable instructions may be located in separate storage media, executed by different processors, and/or propagated over or extant on various transmission media.

As specifically illustrated, media 908 comprises at least processor-executable instructions 910. Processor-executable instructions 910 may comprise, for example, collaboration evaluator 104 and/or dashboard creator 106 (of FIGS. 1, 3, 4, 5, and 7). Generally, processor-executable instructions 910, when executed by processor 906, enable device 902 to perform the various functions described herein. Such functions include, by way of example but not limitation, those that are illustrated in flow diagram 600 (of FIG. 6) and those pertaining to features illustrated in the various block diagrams, as well as combinations thereof, and so forth.

The devices, acts, features, functions, methods, modules, data structures, techniques, components, user interface elements etc. of FIGS. 1-9 are illustrated in diagrams that are divided into multiple blocks and other elements. However, the order, interconnections, interrelationships, layout, etc. in which FIGS. 1-9 are described and/or shown are not intended to be construed as a limitation, and any number of the blocks and/or other elements can be modified, combined, rearranged, augmented, omitted, etc. in many manners to implement one or more systems, methods, devices, media, apparatuses, arrangements, etc. for evaluating users of a collaborative online forum.

Although systems, methods, devices, media, apparatuses, arrangements, and other example embodiments have been described in language specific to structural, logical, algorithmic, and/or functional features, it is to be understood that the invention defined in the appended claims is not necessarily limited to the specific features or acts described above. Rather, the specific features and acts described above are disclosed as example forms of implementing the claimed invention.

What is claimed is:

1. One or more processor-accessible hardware storage media, comprising processor-executable instructions for user evaluation in a collaborative online forum, wherein the processor-executable instructions, when executed, direct one or more devices to perform acts comprising:

evaluating multiple users automatically and without manual intervention based on a combination of post scores of one or more posts submitted to the collaborative online forum and on user interactions in the collaborative online forum, the user interactions being derived from the one or more posts among the multiple users being evaluated for contributing in the one or more posts, the one or more posts comprise content that reflects user ideas represented by user entered phrases of adjacent words discussing a topic relevant to a leading post in a thread and a sub-forum in the collaborative online forum, the evaluating comprising:

accessing the one or more posts that are associated with the multiple users;

ascertaining the post scores for the one or more posts based on one or more features, wherein the one or more features include a relevance feature group comprising at least: (i) a first feature that measures whether a given post is on thread topic and (ii) a second feature that measures whether the given post is on sub-forum topic;

analyzing the user interactions with regard to the one or more posts to identify relationships among the multiple users and the content included in the one or more posts; and evaluating the combination of the post scores and the user interactions to determine respective collaboration scores for respective users of the multiple users responsive to multiple metrics; and presenting a user interface that provides access to the collaboration scores via a supervisor dashboard that displays interactivity graphs reflecting interactions between and among at least selected ones of the multiple users.

2. The one or more processor-accessible storage media as recited in claim 1, wherein the act of presenting comprises:

incorporating into the supervisor dashboard an interactivity graph that represents sizes of contributions from the selected ones of the multiple users and that represents strengths of interactions between and among the selected ones of the multiple users calculated automatically from the one or more posts associated with the multiple users.

3. The one or more processor-accessible storage media as recited in claim 1, wherein the act of presenting comprises:

incorporating into the supervisor dashboard an interactivity graph that represents magnitudes of popularity for multiple topics extracted from the content of the one or more posts and that represents strengths of interactions between and among the multiple topics calculated automatically from the content included in the one or more posts associated with the multiple users.

4. The one or more processor-accessible storage media as recited in claim 1, wherein the act of presenting comprises:

incorporating into the supervisor dashboard one or more user interface elements that enable a supervisor to explore the collaborative online forum to which the one or more posts have been submitted by selected topic and by constituent threads forming the selected topic.

5. A method, which is implemented by one or more devices, for user evaluation in a collaborative online forum, the method comprising acts of:

evaluating multiple users automatically based on a combination of post scores, calculated without manual intervention, of one or more posts submitted to the collaborative online forum and on user interactions, derived from the one or more posts, among the multiple users being evaluated for contributing in the one or more posts, the one or more posts comprise content that reflects user ideas represented by user entered phrases of adjacent words discussing a topic relevant to a leading post in a particular thread, and a sub-forum in the collaborative online forum, the evaluating comprising:

accessing one or more posts that are associated with the multiple users;

ascertaining the post scores for the one or more posts based on one or more features, wherein the one or more features include a relevance feature group comprising at least: (i) a first feature that measures whether a given post is on thread topic and (ii) a second feature that measures whether the given post is on sub-forum topic;

analyzing the user interactions with regard to the one or more posts to identify relationships among the multiple users and the content included in the one or more posts;

evaluating the post scores and the user interactions by a processor to determine respective collaboration scores for respective users of the multiple users; and presenting a user interface that provides access to the collaboration scores.

6. The method as recited in claim 5, wherein the act of ascertaining comprises:

ascertaining the post scores for the one or more posts based on the one or more features using a classifier, wherein the one or more features include one or more of five feature groups comprising a relevance feature group, an originality feature group, a forum-specific feature group, a surface feature group, and a posting component feature group.

7. The method as recited in claim 5, wherein the act of ascertaining comprises:
ascertaining the post scores for the one or more posts based on the one or more features, wherein the one or more features include an originality feature group comprising at least: (i) a first feature that measures a degree of overlap between a given post and leading posts in the particular thread and (ii) a second feature that measures a number of posts between the given post and a most-overlapping post as determined by the first feature.

8. The method as recited in claim 5, wherein the act of ascertaining comprises:
ascertaining the post scores for the one or more posts based on the one or more features, wherein the one or more features include a forum-specific feature group comprising at least: (i) a first feature that measures a ratio of quoted text to a size of a given post as normalized by a size of an original post and (ii) a second feature that measures a number of replies that the given post generates.

9. The method as recited in claim 5, wherein the act of ascertaining comprises:
ascertaining the post scores for the one or more posts based on the one or more features, wherein the one or more features include a surface feature group comprising at least: (i) a first feature that measures an inter-posting time for a given post as normalized by an average inter-posting time of a community of the collaborative online forum, (ii) a second feature that measures a word count of the given post as normalized by an average length for posts of the particular thread, and (ii) a third feature that measures use of creative punctuation and number of emoticons in the given post as normalized by a length of the given post.

10. The method as recited in claim 5, wherein the act of ascertaining comprises:
ascertaining the post scores for the one or more posts based on the one or more features, wherein the one or more features include a posting component feature group comprising at least: (i) a first feature that measures a value contributed to a given post by a web-link that is included in the given post and (ii) a second feature that measures questions contained within the given post with respect to other questions in the collaborative online forum.

11. The method as recited in claim 5, wherein the act of evaluating comprises:
evaluating the post scores and the user interactions to determine the collaboration scores for the multiple users responsive to at least one of four metrics, wherein the four metrics comprise a quality metric, a quantity metric, a consistency metric, and an interactivity metric.

12. The method as recited in claim 5, wherein the act of evaluating comprises:
evaluating the post scores to determine an individual collaboration score for an individual user of the multiple users responsive to a quality metric that reflects the post scores for the individual user on a thread level.

13. The method as recited in claim 5, wherein the act of evaluating comprises:
evaluating the user interactions and the content of the one or more posts to determine an individual collaboration score for an individual user of the multiple users responsive to a quantity metric that reflects a volume of contributions by the individual user relative to a volume of contributions from other users.

14. The method as recited in claim 5, wherein the act of evaluating comprises:
evaluating the user interactions to determine an individual collaboration score for an individual user of the multiple users responsive to a consistency metric that reflects whether the individual user contributes regularly over a period of time instead of in a burst-like pattern.

15. The method as recited in claim 5, wherein the act of evaluating comprises:
evaluating the user interactions to determine an individual collaboration score for an individual user of the multiple users responsive to an interactivity metric that reflects how many other users the individual user interacts with by considering a number of different threads to which the individual user posts and a number of participants contributing to the different threads.

16. The method as recited in claim 5, wherein the act of presenting comprises:
presenting the user interface that provides access to the collaboration scores, wherein the user interface includes a dashboard that displays an interactivity graph representing at least sizes of threads and strengths of interactions between the threads using different sizes of displayed icons and thickness of interconnecting lines among the displayed icons.

17. A device for evaluating users in a collaborative online forum, the device comprising:
one or more memories operatively coupled to one or more processors providing:
a collaboration evaluator to evaluate multiple users automatically by accessing a combination of post scores of one or more posts that are associated with multiple users being evaluated for contributing in the one or more posts and user interactions among the multiple users, each post of the one or more posts including content, the content reflects user ideas represented by user entered phrases of adjacent words discussing a topic relevant to a leading post in a thread and a sub-forum in the collaborative online forum; the collaboration evaluator including:
a post score ascertainer to ascertain the post scores for the one or more posts automatically using a classifier based on one or more features including at least a measure of matching between the user entered phrases and words of the leading post, wherein the one or more features include a relevance feature group comprising at least: (i) a first feature that measures whether a given post is on thread topic and (ii) a second feature that measures whether the given post is on sub-forum topic;
a user interactions analyzer to analyze the user interactions with regard to the one or more posts using natural language processing to identify relationships among the multiple users and the content included in the one or more posts; and
a collaboration score determiner to receive metrics corresponding to the post scores and the user interactions and evaluate the combination of the post scores and the user interactions to determine respective collaboration scores for respective users of the multiple users; and
a dashboard creator to present a user interface that provides access to the collaboration scores.

18. The device as recited in claim 17, wherein the dashboard creator is to present the user interface that provides access to the collaboration scores with the user interface including an ability to display a listing of top collaborators for different interaction categories and to switch the listing of top collaborators to a top collaborator interactivity graph representing strengths of the interactions between the top collaborators.

19. The device as recited in claim 17, wherein the collaboration score determiner is to determine the collaboration scores for the multiple users responsive to multiple ranking metrics; and wherein the dashboard creator is to present the user interface that provides access to the collaboration scores with the user interface to enable a supervisor to adjust relative percentage values of the multiple ranking metrics that are used by the collaboration score determiner.

\* \* \* \* \*